UNITED STATES PATENT OFFICE.

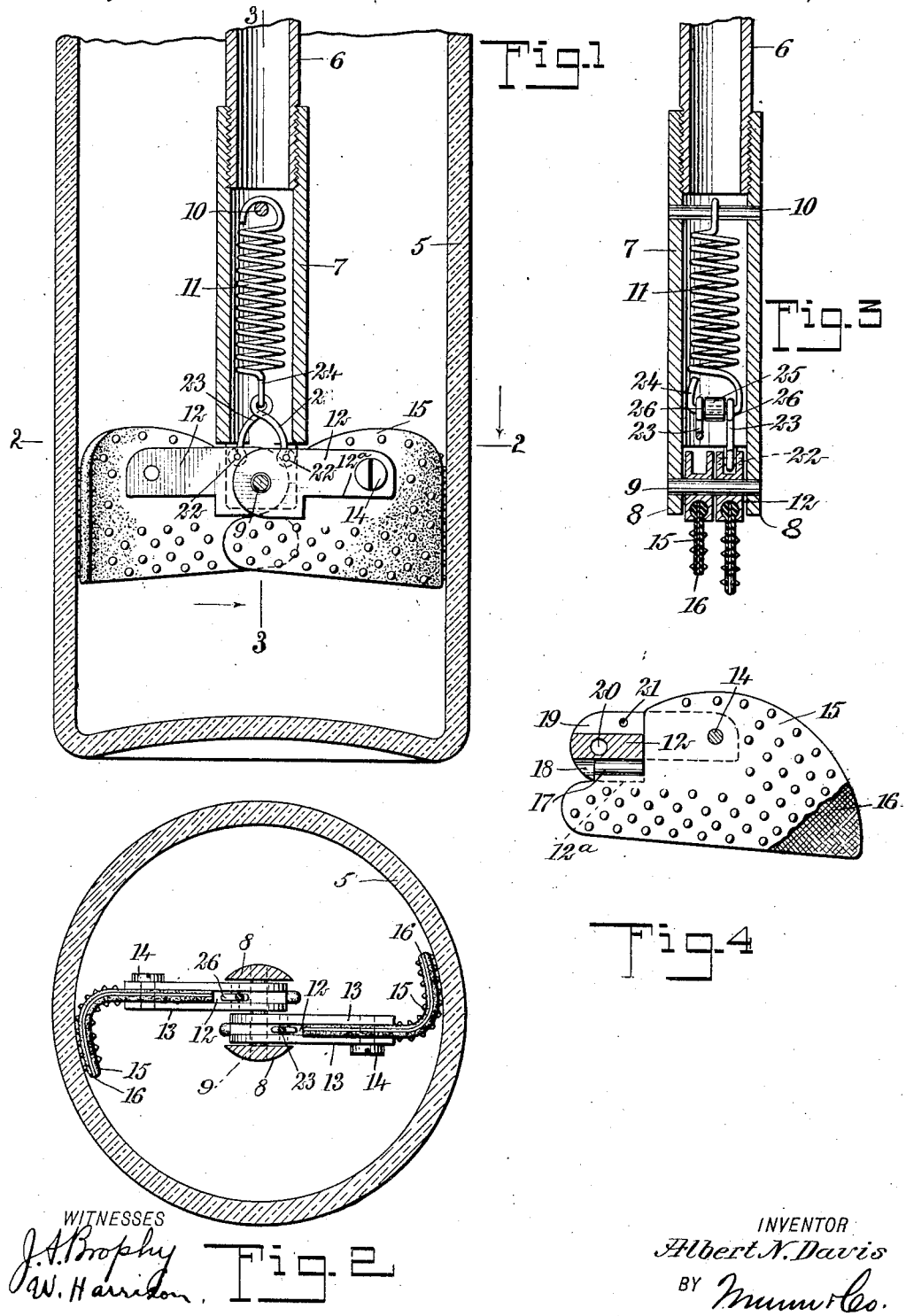

ALBERT N. DAVIS, OF NEW YORK, N. Y., ASSIGNOR TO CHARLES K. VOLCKENING, OF BROOKLYN, NEW YORK.

MOUNTING FOR BOTTLE-WASHER BRUSHES.

No. 912,085.  Specification of Letters Patent.  Patented Feb. 9, 1909.

Application filed September 19, 1908. Serial No. 453,835.

*To all whom it may concern:*

Be it known that I, ALBERT N. DAVIS, a citizen of the United States, and a resident of the city of New York, borough of Brooklyn, in the county of Kings and State of New York, have invented a new and Improved Mounting for Bottle-Washer Brushes, of which the following is a full, clear, and exact description.

My invention relates to bottle washer brushes, my more particular purpose being to improve the mountings for such brushes.

Reference is to be had to the accompanying drawings forming a part of this specification, in which similar characters of reference indicate corresponding parts in all the figures.

Figure 1 is a fragmentary section showing my improved device in operation; Fig. 2 is a horizontal section upon the line 2—2 of Fig. 1, looking in the direction of the arrow, and showing the pivotal mountings for the brush arms carrying the flexible brushes upon the ferrule; Fig. 3 is a vertical section upon the line 3—3 of Fig. 1, looking in the direction of the arrow, and showing the brush arms, the brushes and spring mechanism connected with the brushes for causing the same to open; and Fig. 4 is a view partly in plan and partly in section, showing one of the brush arms carrying its brush.

A bottle to be washed is shown at 5.

At 6 is a tubular spindle which carries a ferrule 7 secured rigidly thereupon. This ferrule is provided with ears 8 which support a pivot pin 9 extending from one of the ears 8 directly across to the other. Mounted within the ferrule 7 is a pin 10, and connected with the latter is a spiral spring 11. Journaled upon the pivot pin 9 are brush arms 12, each being provided with clamping plates 13 between which is the brush 15. The clamping plates are connected by a screw 14 the pressure of which causes them to approach each other and thus bind upon opposite sides of the brush. This brush is made of rubber and is reinforced with canvas 16, as will be understood from Fig. 4. Each brush 15 is provided with a substantially cylindrical portion 17, and each brush arm 12 is provided with a slot 18, the general form of which is substantially cylindrical. The cylindrical portion 17 of the brush fits neatly into the slot 18 of the brush arm, and may be inserted in position by merely pushing the brush into the brush arm, that is, toward the left relatively to the brush arm, according to the view shown in Fig. 4.

In practice the cylindrical portion 17 of the brush is first pushed into the slot 18 of the brush arm, the clamping plates 13 being sprung slightly apart in order to permit the ready insertion of the body portion of the brush. The screw 14 is next placed in position and causes the clamping plates to grip tightly upon opposite sides of the brush.

Each brush arm 12 is provided with a slot 19, and with a main pivot hole 20 and a smaller pivot hole 21. The pivot 9 extends through the pivot holes 20 of the brush. Each pivot hole 21 is fitted with a smaller pivot 22, and connecting the two pivots 22 of the two brushes is a bail 23. The two bails are connected together by a hook 24 at the end of spring 11, which extends through eyes 26 carried by the bails, and also through a spacing block 25 having the form of a roller, as indicated in Fig. 3. The tension of the spring 11, by pulling upon the bails 23, and consequently upon the pivots 22, gives the arms 12 a tendency to spring out, as indicated in Fig. 1, so that the brushes are brought into engagement with the interior of the bottle 5. This movement occurs whenever the device is inserted within the bottle. In order to do this, the brushes are rocked upon the pivots 9 so that the outer ends of the brushes approach each other, and with the brushes and brush arms in this position, they are inserted through the neck of the bottle. Once inside they spring outwardly and engage the interior of the bottle, as indicated in Fig. 1. The brushes being now actuated in the usual manner, and water being caused to flow through the spindle 6, the interior of the bottle is effectively washed. This operation being completed, the withdrawal of the device from the bottle causes the brushes to be forced toward each other for an instant, they spring backward into normal position immediately afterward.

It will be noted that the brush arms 12 are slightly cut away at the point 12ª, as indicated in Fig. 1. This is for the purpose of facilitating the entrance of the brushes into the brush arms and also to enable the operator to guide the cylindrical portion 17 of the brush into the slot 18. This he does by grasping the arm at any convenient point adjacent to the cylindrical portion 17 and steadying this portion as it is pushed into the slot 18. The brush arms 12 are unable to bend backward to any appreciable extent, for the reason that, being journaled upon the pivot 9 and encountering the body portion of the ferrule 7, their movement backward is thus limited. The net result is that the brushes normally stand straight out from the axis of the ferrule, as a center, and can not be bent from this direction except as above described. The bail 23 being of spring metal permits the pivots 22 upon the two arms to move slightly toward and from each other in order to accommodate the swinging movement of the arms.

Having thus described my invention, I claim as new and desire to secure by Letters Patent:

1. The combination of a ferrule, brush arms journaled thereupon, a spring connected with said ferrule, and a bail connected with said brush arms and with said spring.

2. The combination of a ferrule provided with ears, a pivot extending from one of said ears to another, brush arms journaled upon said pivot and adapted to rock, said brush arms being so positioned as to engage portions of said ferrule, thereby limiting the travel of said arms, and mechanism connected with said arms for moving the same upon said pivot.

3. The combination of a brush arm provided with a slot, and with clamping plates, a brush provided with portions disposed intermediate said clamping plates, said brush being further provided with a portion fitting into said slot.

4. The combination of a ferrule, brush arms journaled thereupon and provided with slots, pins carried by said brush arms and extending into said slots, a bail connecting the pin of one arm with the pin of another arm, and a spring connected with said bail and with said ferrule.

5. The combination of a ferrule, brush arms journaled thereupon, a spring for actuating said brush arms, a spacing member mounted upon said spring, and bails disposed upon opposite sides of said spacing member and connected with different arms for the purpose of actuating the same.

6. The combination of a brush arm provided with clamping plates, and further provided with a slot, a brush having a portion to be inserted intermediate said clamping plates, said brush being further provided with a portion to be pushed into said slot, and means for causing said clamping plates to grip the portion of said brush intermediate said clamping plates.

7. The combination of a ferrule, a pair of brush arms journaled thereupon, a tensile spring, a connection from said tensile spring to both of said brush arms for the purpose of moving said brush arms in opposite directions.

8. The combination of a ferrule, brush arms journaled thereupon and adapted to swing outwardly, a single tensile spring for actuating both of said brush arms and a bail, journaled to both of said brush arms and connected with said tensile spring for the purpose of actuating said brush arms.

9. The combination of a ferrule, brush arms journaled thereupon and adapted to swing outwardly, said brush arms being provided with slots, fastening members mounted within said slots, a tensile spring supported by said ferrule, and connections from said tensile spring to said fastening members within said slots.

In testimony whereof I have signed my name to this specification in the presence of two subscribing witnesses.

ALBERT N. DAVIS.

Witnesses:
WALTON HARRISON,
JOHN P. DAVIS.